United States Patent
Nakajima

(10) Patent No.: US 10,008,175 B2
(45) Date of Patent: Jun. 26, 2018

(54) SIGNAL OUTPUT APPARATUS FOR REDUCING POWER CONSUMPTION DURING DISPLAY ON A PLURALITY OF IMAGE DISPLAY APPARATUSES

(71) Applicant: SONY CORPORATION, Tokyo (JP)

(72) Inventor: Yasuhisa Nakajima, Kanagawa (JP)

(73) Assignee: SONY CORPORATION, Tokyo (JP)

(*) Notice: Subject to any disclaimer, the term of this patent is extended or adjusted under 35 U.S.C. 154(b) by 0 days. days.

(21) Appl. No.: 14/896,662

(22) PCT Filed: Jun. 5, 2014

(86) PCT No.: PCT/JP2014/003012
§ 371 (c)(1),
(2) Date: Dec. 7, 2015

(87) PCT Pub. No.: WO2014/199605
PCT Pub. Date: Dec. 18, 2014

(65) Prior Publication Data
US 2016/0133224 A1 May 12, 2016

(30) Foreign Application Priority Data
Jun. 13, 2013 (JP) ................................. 2013-124613

(51) Int. Cl.
*G09G 5/00* (2006.01)
*G09F 3/14* (2006.01)
(Continued)

(52) U.S. Cl.
CPC ........... *G09G 5/005* (2013.01); *G06F 3/1446* (2013.01); *H04N 7/0122* (2013.01); *H04N 7/183* (2013.01);
(Continued)

(58) Field of Classification Search
CPC .... G06F 3/1446; H04N 7/183; H04N 7/0122; G09G 5/005; G09G 2300/026;
(Continued)

(56) References Cited

U.S. PATENT DOCUMENTS

2001/0038387 A1* 11/2001 Tomooka ............. G09G 3/3644
345/520
2001/0052902 A1* 12/2001 Ono ....................... G06F 3/1438
345/502

(Continued)

FOREIGN PATENT DOCUMENTS

JP   H09-204164 A   8/1997
JP   2008-096746 A  4/2008

*Primary Examiner* — Paulos M Natnael
*Assistant Examiner* — Sean N. Haiem
(74) *Attorney, Agent, or Firm* — Chip Law Group

(57) ABSTRACT

An apparatus, method and computer-readable storage medium for transmitting image signals. The apparatus, method and computer-readable storage medium can receive, at a first frame rate, a first image signal having an image with a first resolution; and output, at a second frame rate, a second image signal comprised of a plurality of images having a second resolution. The first resolution may be greater than the second resolution and the second frame rate may be greater than the first frame rate, so as to satisfy the condition that the first resolution multiplied by the first frame rate is equal to the second resolution multiplied by the second frame rate.

16 Claims, 11 Drawing Sheets

(51) Int. Cl.
*H04N 7/18* (2006.01)
*H04N 7/01* (2006.01)
*G09G 5/18* (2006.01)
*G06F 3/14* (2006.01)

(52) U.S. Cl.
CPC ............... *G09G 5/006* (2013.01); *G09G 5/18* (2013.01); *G09G 2300/026* (2013.01); *G09G 2330/021* (2013.01); *G09G 2340/0407* (2013.01); *G09G 2340/0435* (2013.01); *G09G 2340/0442* (2013.01); *G09G 2370/04* (2013.01); *G09G 2370/12* (2013.01)

(58) Field of Classification Search
CPC ....... G09G 2340/0442; G09G 2370/12; G09G 5/18; G09G 2330/021; G09G 2340/0407; G09G 2340/0435; G09G 2370/04; G09G 5/006
See application file for complete search history.

(56) References Cited

U.S. PATENT DOCUMENTS

| | | | | |
|---|---|---|---|---|
| 2005/0157272 | A1* | 7/2005 | Childers | G09G 3/007 353/84 |
| 2006/0139378 | A1* | 6/2006 | Hon | G09G 3/2022 345/692 |
| 2007/0127578 | A1* | 6/2007 | Wu | H04N 19/44 375/240.25 |
| 2008/0211825 | A1* | 9/2008 | Sunakawa | G06F 3/1446 345/581 |
| 2008/0273005 | A1* | 11/2008 | Chen | G09G 3/3413 345/102 |
| 2009/0002297 | A1* | 1/2009 | Sakai | G03B 21/14 345/87 |
| 2011/0229106 | A1* | 9/2011 | Cho | H04N 5/775 386/219 |
| 2012/0249565 | A1* | 10/2012 | Ishii | G09G 5/006 345/531 |

* cited by examiner

[Fig. 1]
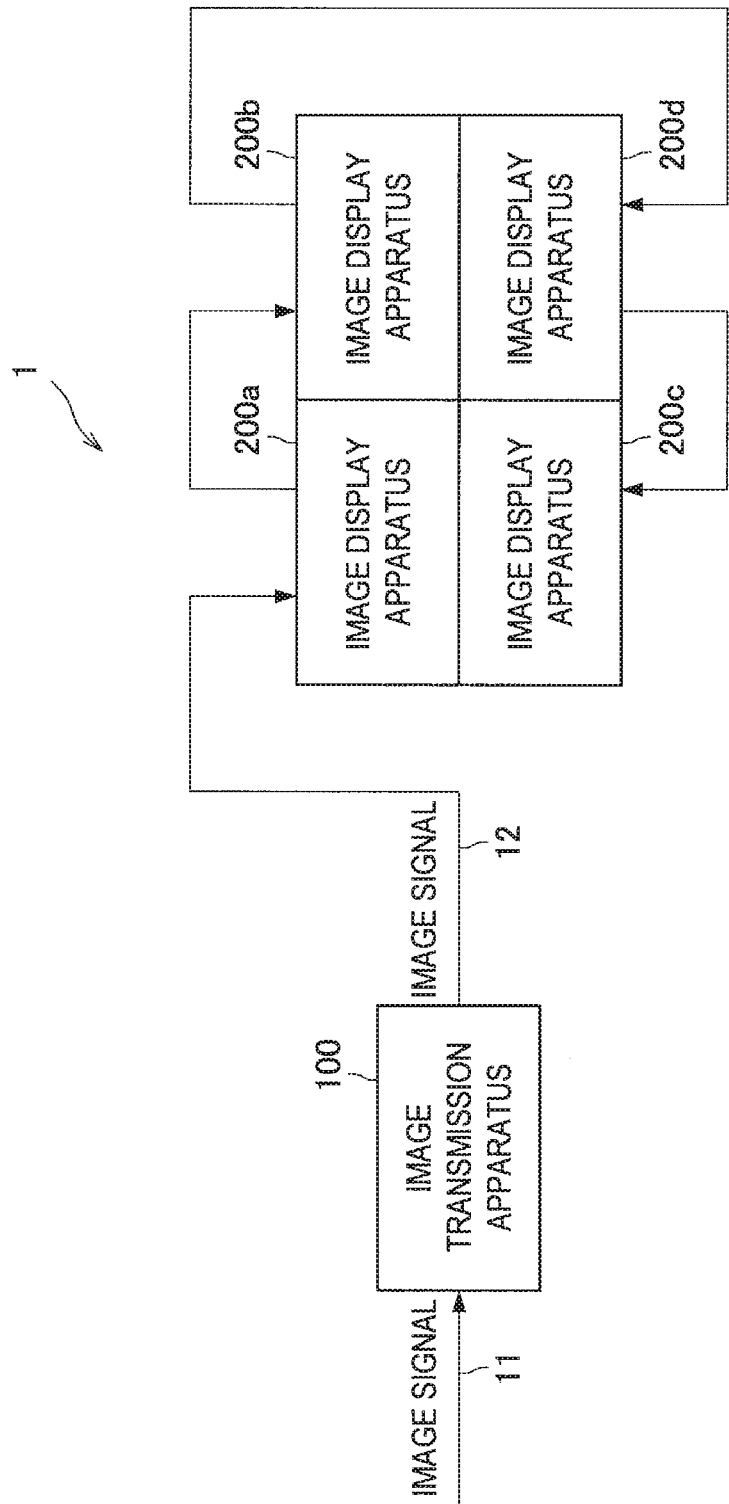

[Fig. 2]
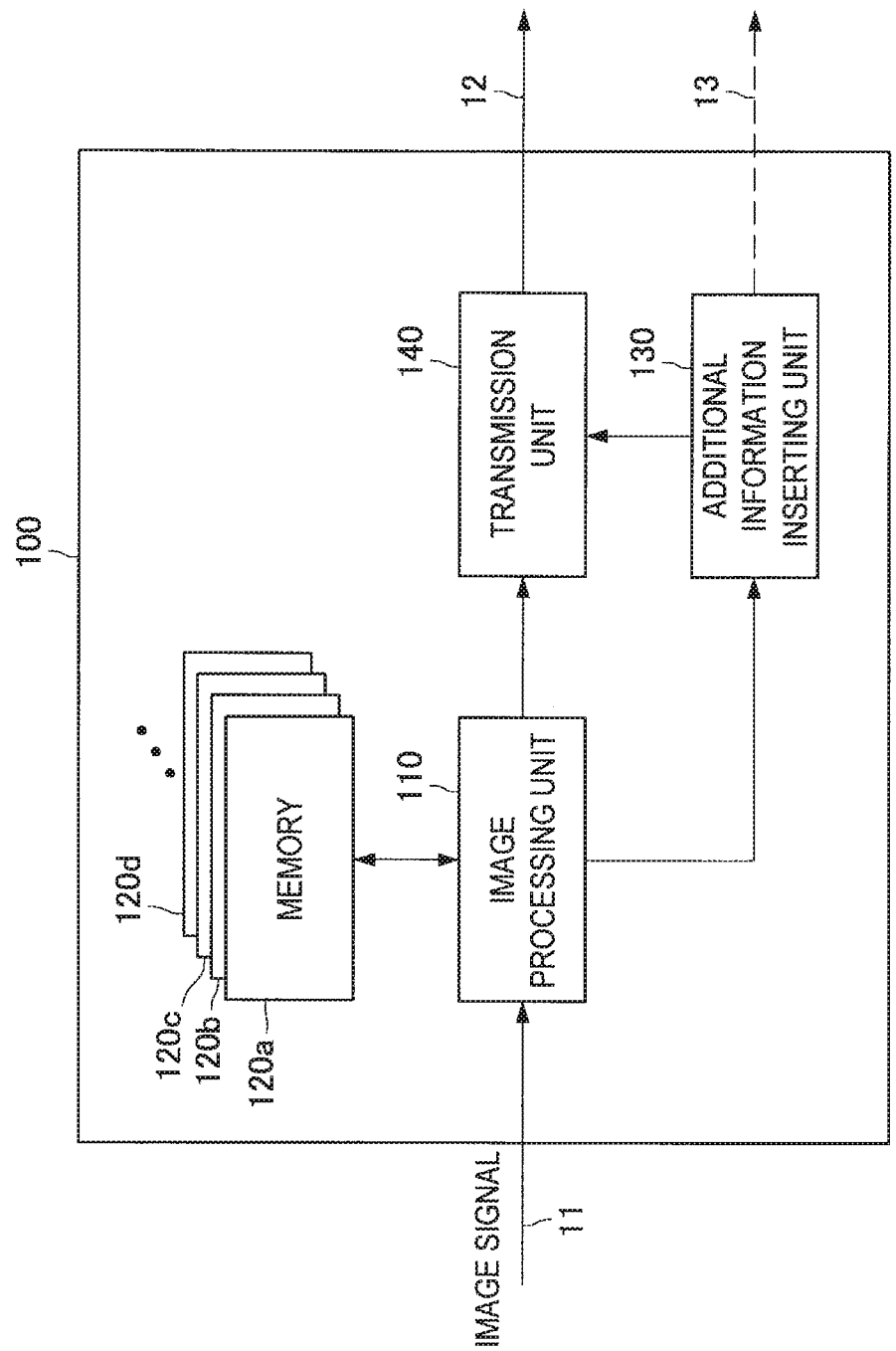

[Fig. 3]
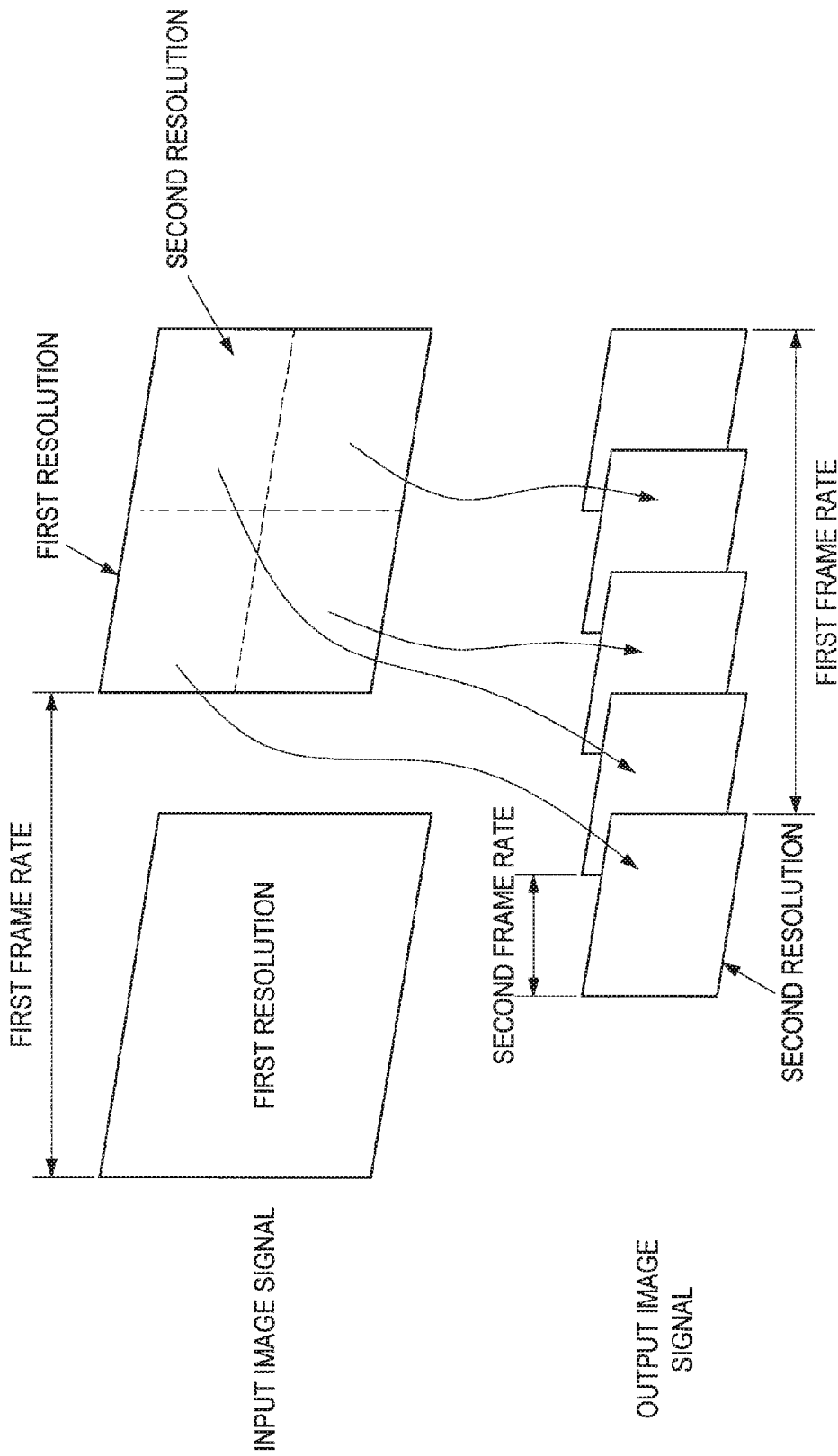

[Fig. 4]
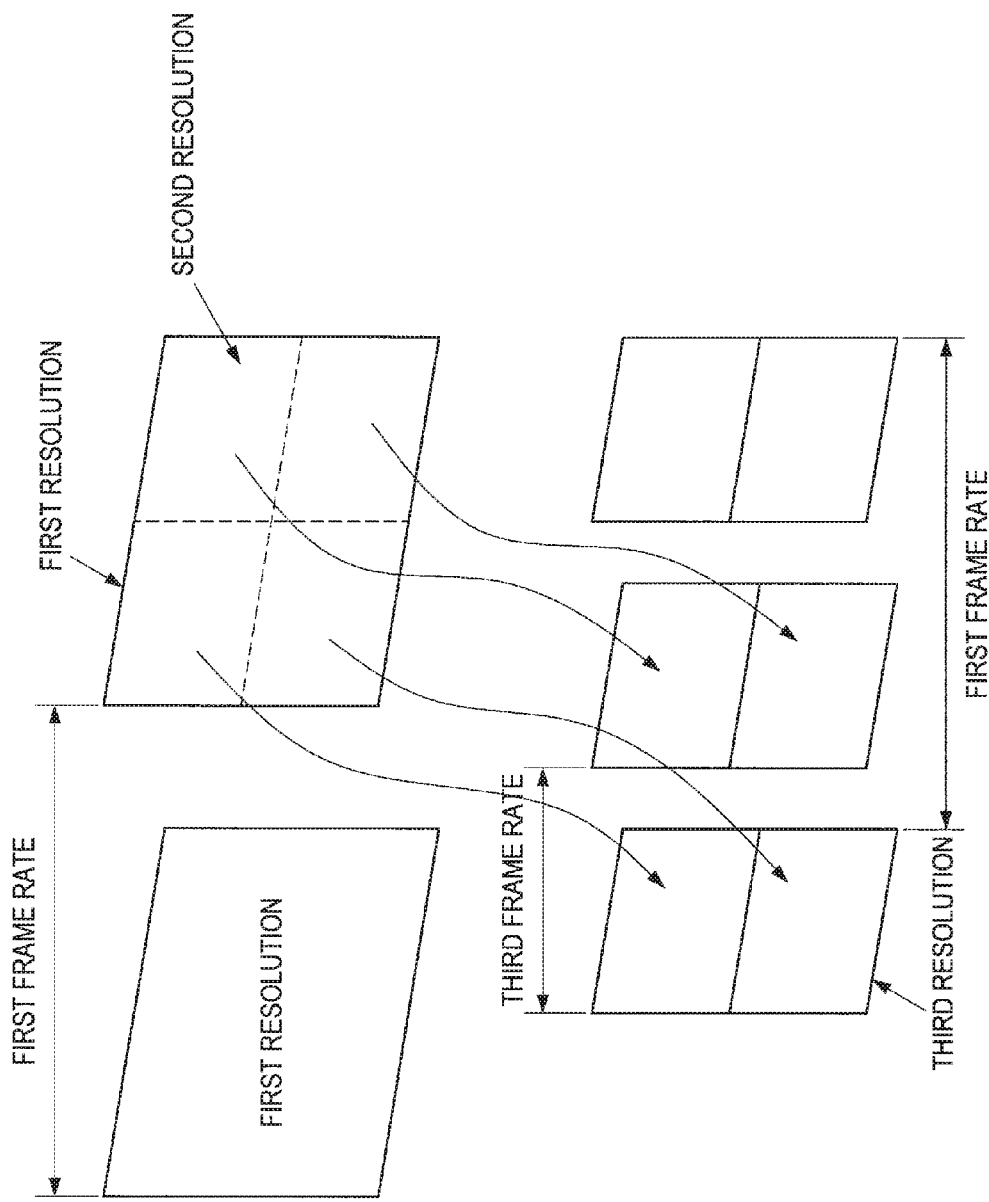

[Fig. 5]
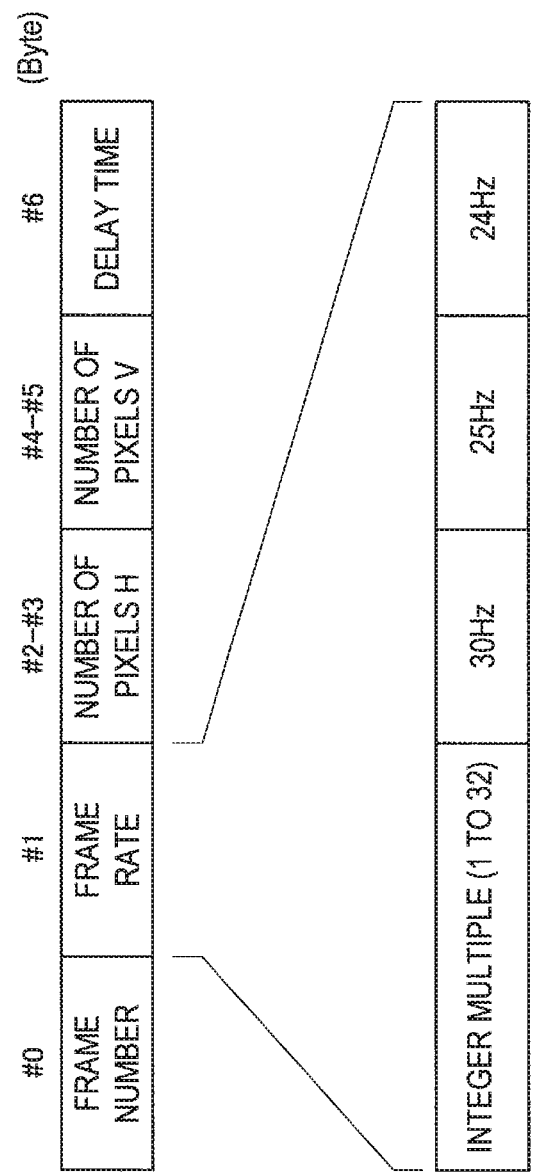

[Fig. 6]
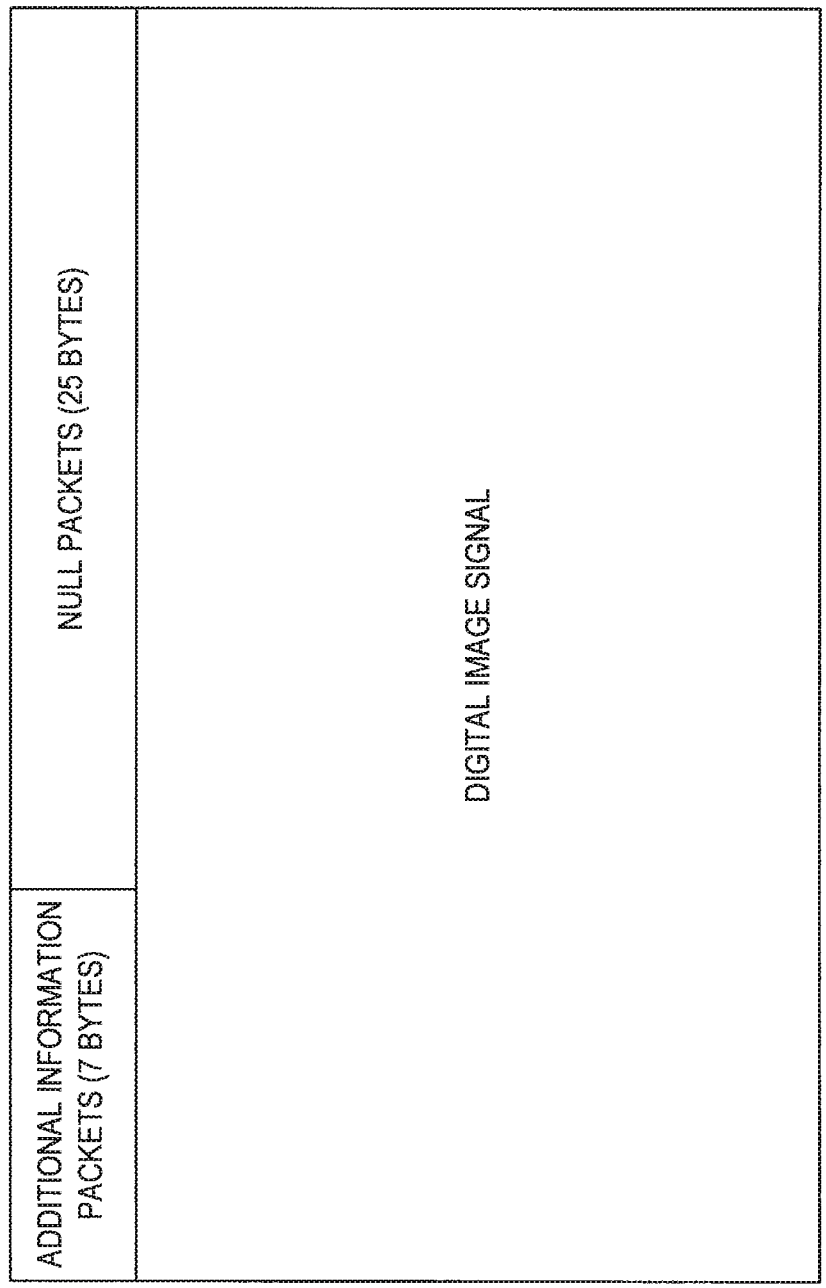

[Fig. 7]
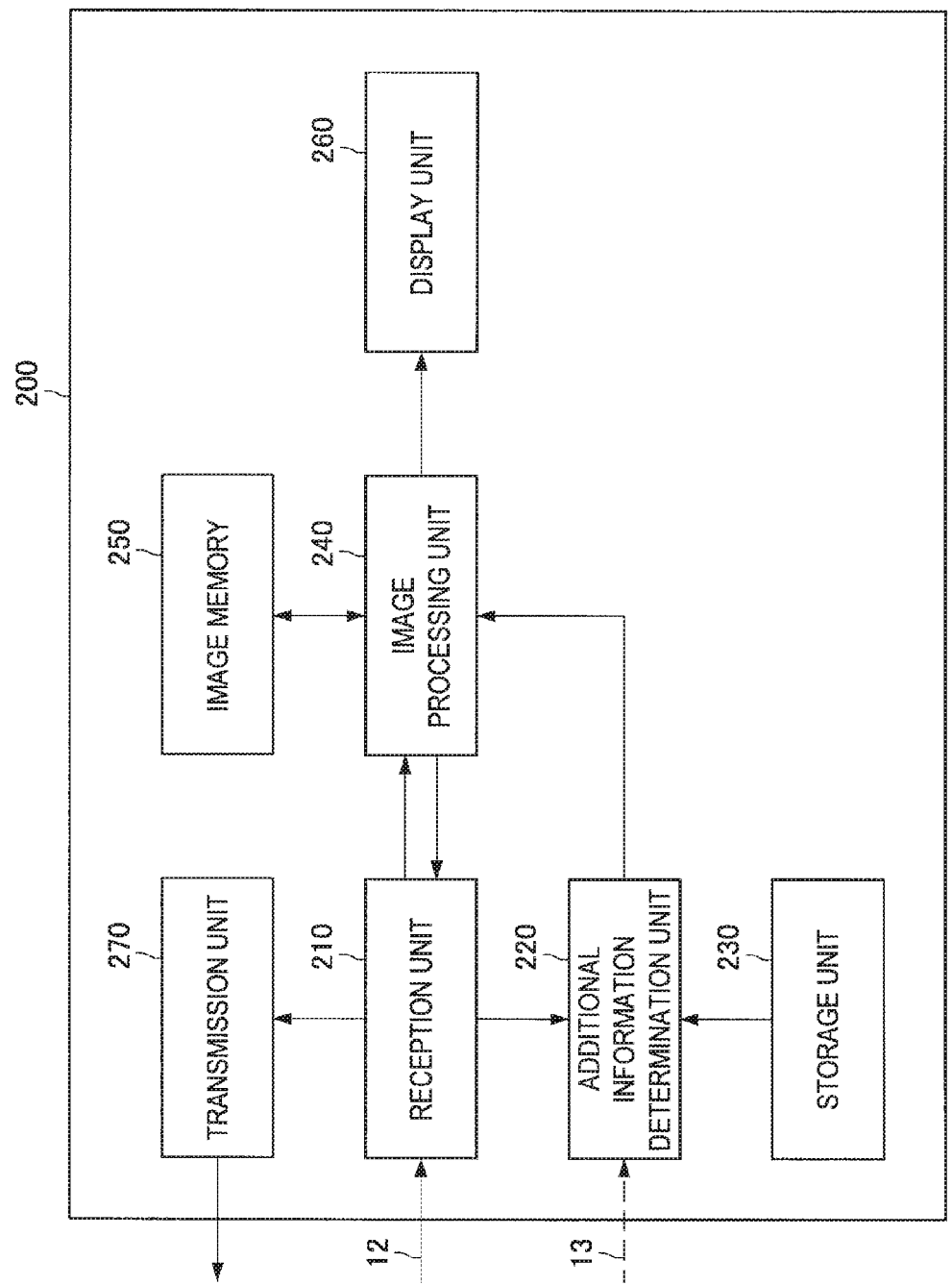

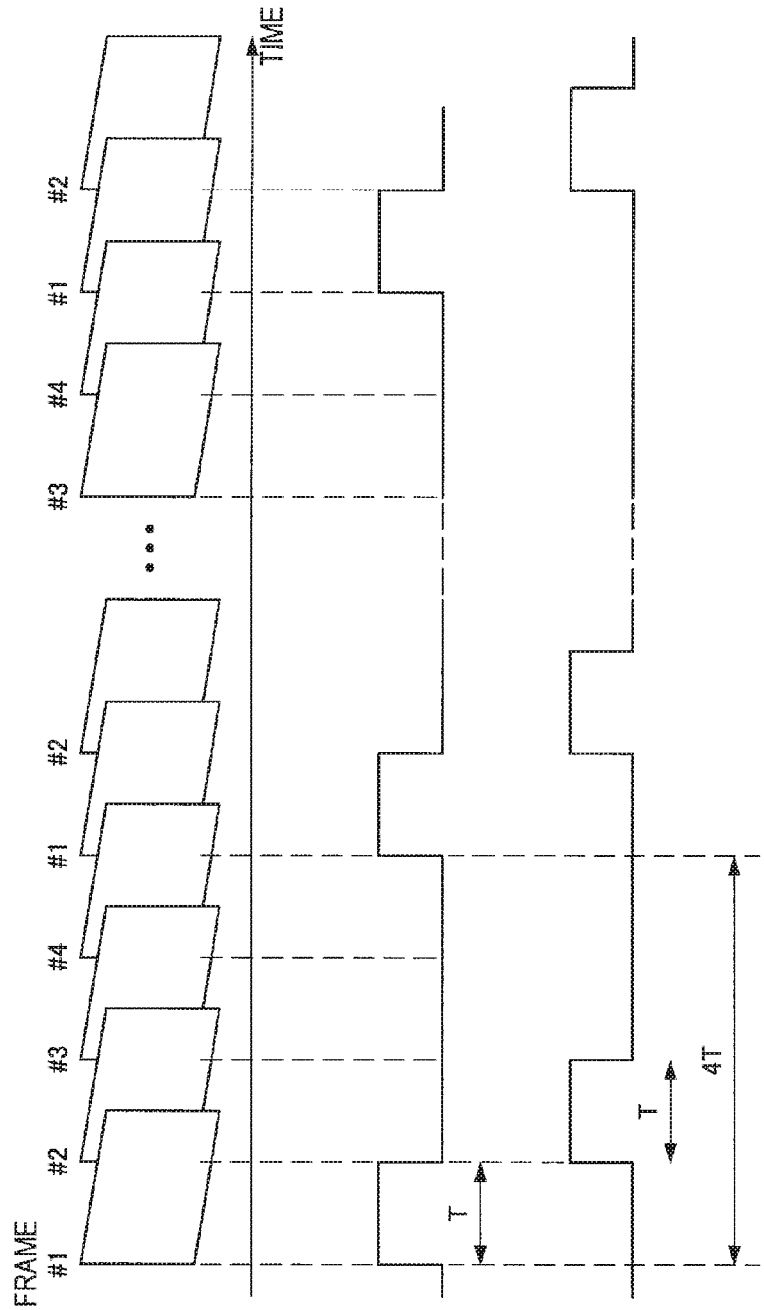

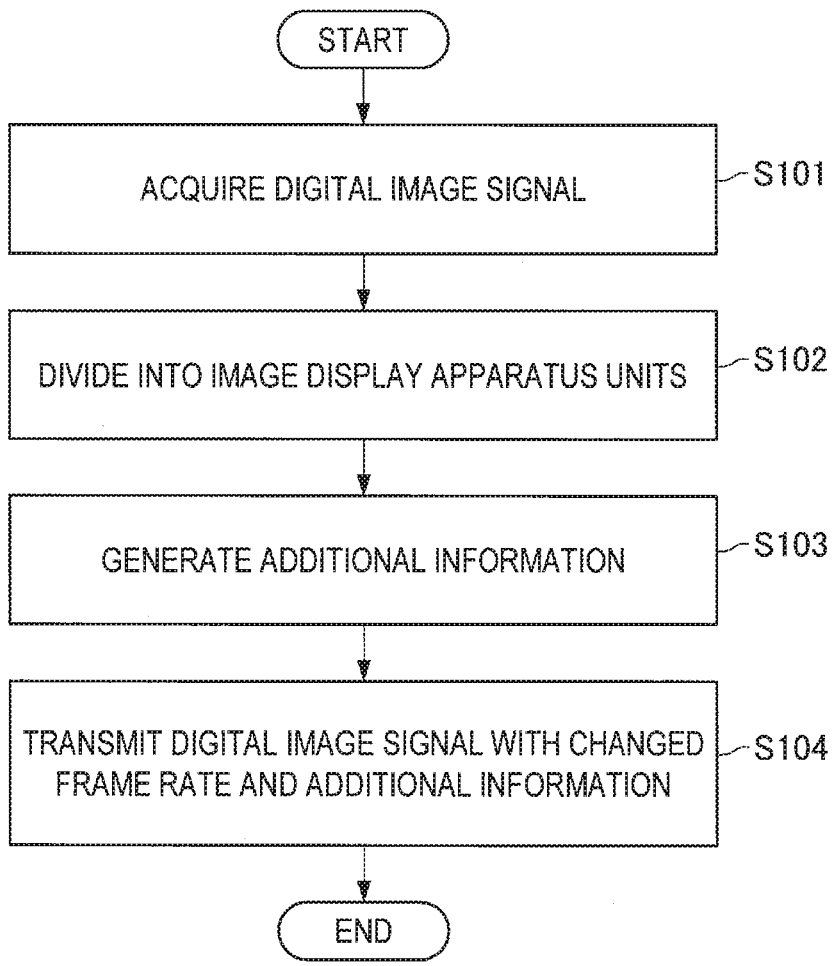
[Fig. 9]

[Fig. 10]
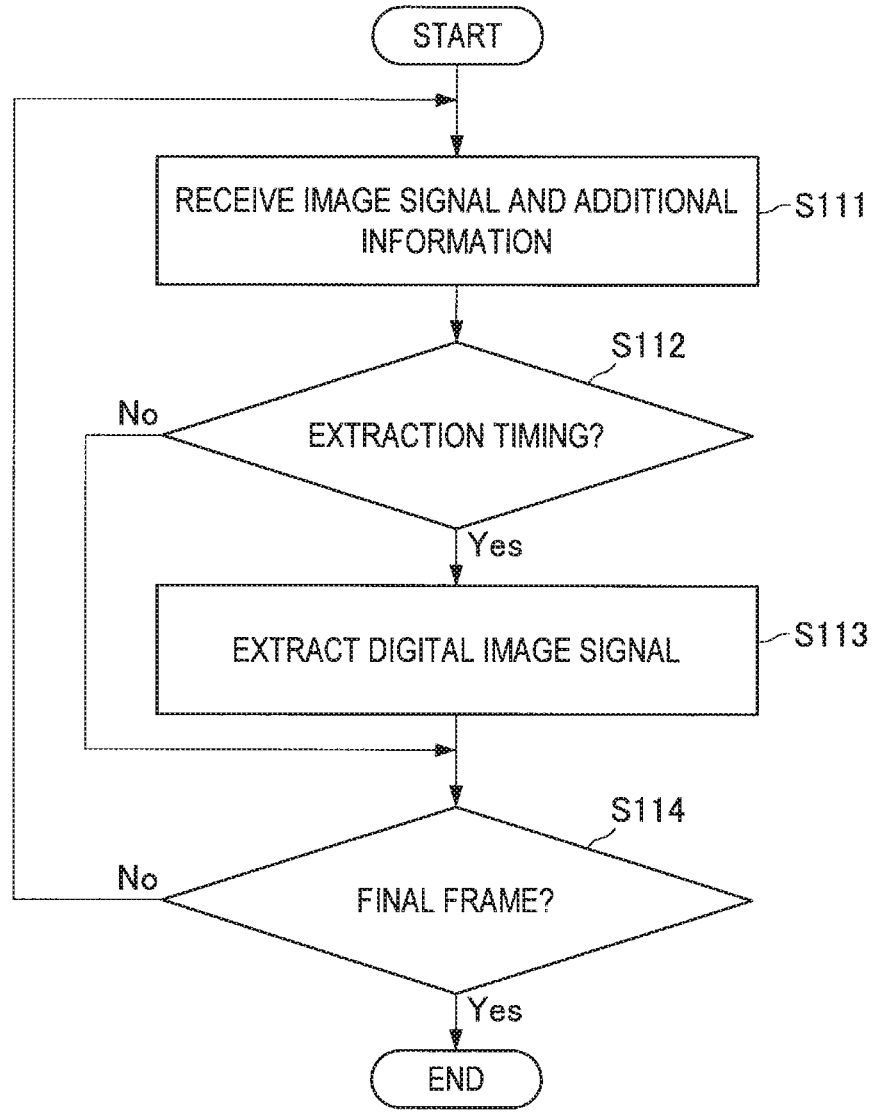

[Fig. 11]
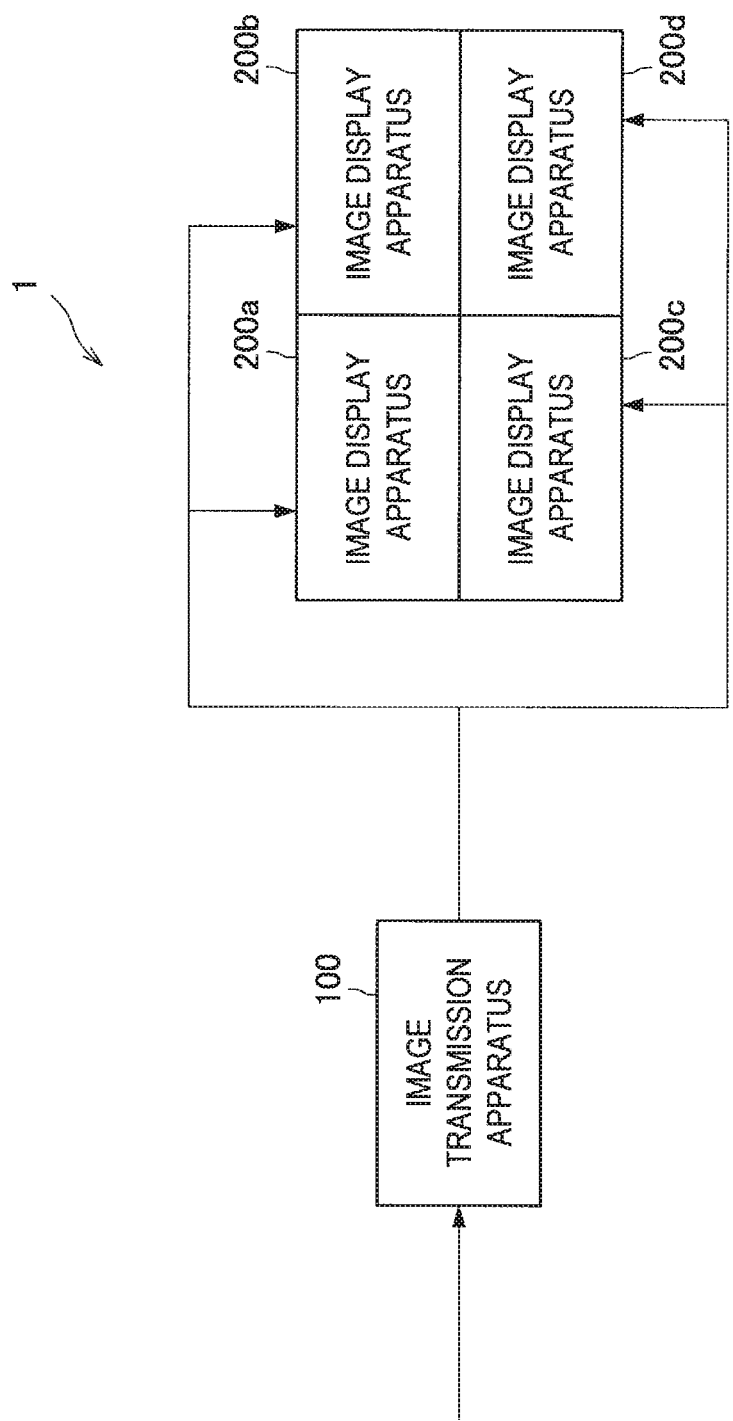

SIGNAL OUTPUT APPARATUS FOR REDUCING POWER CONSUMPTION DURING DISPLAY ON A PLURALITY OF IMAGE DISPLAY APPARATUSES

CROSS REFERENCE TO RELATED APPLICATIONS

This application claims the benefit of Japanese Priority Patent Application JP 2013-124613 filed Jun. 13, 2013, the entire contents of which are incorporated herein by reference.

TECHNICAL FIELD

The present disclosure relates to a signal output apparatus, a signal output method, and an image display apparatus.

BACKGROUND ART

The development of digital image technology has been accompanied by progress towards the realization of a video format called "4K" with a screen resolution of around 4,000 horizontal pixels and around 2,000 vertical pixels. In addition, research and development are also progressing into a video format that exceeds 4K and has a screen resolution of 7,680 horizontal pixels and 4,320 vertical pixels.

For video formats with such screen resolutions, images are displayed not on a single display but instead spread across a plurality of displays. When a digital image signal is transferred to a plurality of displays, a method is used where the transmitter of the images transfers image data of a line sequence and the individual displays detect and extract the regions to be displayed. Technologies for transferring and extracting images are disclosed in Patent Literature 1 and 2, for example.

CITATION LIST

Patent Literature

[PTL 1]
JP 2008-96746A
[PTL 2]
JP H9-204164A

SUMMARY

Technical Problem

When the resolution of a digital image signal to be transferred is changed, it has been necessary on the display side to change the region data to be used when detecting the region to be displayed. It has also been necessary on the display side to place a circuit that carries out an extraction determination process and an acquisition process for image data in an operating state during an entire screen period of the image data in the digital image signal, which has led to an increase in power consumption.

For this reason, the present disclosure aims to provide a novel and improved signal output apparatus, signal output method, and image display apparatus that are capable of reducing power consumption when the displaying of images is spread across a plurality of image display apparatuses.

Solution to Problem

Embodiments of the present disclosure include an apparatus for transmitting image signals comprising: processing circuitry configured to receive, at a first frame rate, a first image signal having an image with a first resolution; and output, at a second frame rate, a second image signal comprised of a plurality of images having a second resolution, where the first resolution is greater than the second resolution and the second frame rate is greater than the first frame rate, so as to satisfy the condition that the first resolution multiplied by the first frame rate is equal to the second resolution multiplied by the second frame rate.

Embodiments of the present disclosure can also include a method for transmitting image signals comprising: receiving at a first frame rate, using a processor, a first image signal having an image with a first resolution; and outputting at a second frame rate, using the processor, a second image signal comprised of a plurality of images having a second resolution, where the first resolution is greater than the second resolution and the second frame rate is greater than the first frame rate, so as to satisfy the condition that the first resolution multiplied by the first frame rate is equal to the second resolution multiplied by the second frame rate.

Additionally, embodiments of the present disclosure can include a non-transitory computer-readable storage medium storing computer-readable instructions that, when executed by a computer, cause the computer to perform a method comprising: receiving, at a first frame rate, a first image signal having an image with a first resolution; and outputting, at a second frame rate, a second image signal comprised of a plurality of images having a second resolution, where the first resolution is greater than the second resolution and the second frame rate is greater than the first frame rate, so as to satisfy the condition that the first resolution multiplied by the first frame rate is equal to the second resolution multiplied by the second frame rate.

Advantageous Effects of Invention

According to the above embodiments of the present disclosure, it is possible to provide a novel and improved signal output apparatus, a signal output method, and an image display apparatus that are capable of reducing power consumption when the displaying of images is spread across a plurality of image display apparatuses.

BRIEF DESCRIPTION OF DRAWINGS

FIG. 1 is an explanatory diagram showing an example configuration of an image transfer system 1 according to an embodiment of the present disclosure.

FIG. 2 is an explanatory diagram showing an example functional configuration of an image transmission apparatus 100 according to an embodiment of the present disclosure.

FIG. 3 is an explanatory diagram conceptually showing an example of image processing by an image processing unit 110.

FIG. 4 is an explanatory diagram conceptually showing an example of image processing by the image processing unit 110.

FIG. 5 is an explanatory diagram showing an example of additional information generated by the image processing unit 110.

FIG. 6 is an explanatory diagram showing an example data structure of a digital image signal and the additional information.

FIG. 7 is an explanatory diagram showing an example functional configuration of an image display apparatus 200 according to an embodiment of the present disclosure.

FIG. 8 is an explanatory diagram conceptually showing an intermittent reception instruction outputted from an image processing unit 240 to a reception unit 210.

FIG. 9 is a flowchart showing an example operation of the image transmission apparatus 100 according to an embodiment of the present disclosure.

FIG. 10 is a flowchart showing an example operation of an image display apparatus 200 according to an embodiment of the present disclosure.

FIG. 11 is an explanatory diagram showing an example configuration of an image transfer system 1 according to an embodiment of the present disclosure.

DESCRIPTION OF EMBODIMENTS

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The following description is given in the order indicated below.
1. Embodiment of the Present Disclosure
Overview
Example System Configuration
Example Functional Configuration of Image Transmission Apparatus
Example Functional Configuration of Image Display Apparatus
Example Operation of Image Transmission Apparatus
Example Operation of Image Display Apparatus
2. Conclusion
1. Embodiment of the Present Disclosure
Overview First, an overview of the present disclosure will be described by way of a detailed description of a preferred embodiment of the present disclosure. As mentioned above, the development of digital image technology has been accompanied by progress in the research and development of a video format called 4K with a screen resolution of around 4,000 horizontal pixels and around 2,000 vertical pixels and also a video format that exceeds 4K and has a screen resolution of 7,680 horizontal pixels and 4,320 vertical pixels. Images in such image formats are displayed not on a single display but instead spread across a plurality of displays.

When transferring a digital image signal with a resolution of 4K or higher to a plurality of displays, as one example a method is used where the transmitter of images transfers image data of a line sequence and the individual displays detect and extract the regions to be displayed.

However, when the resolution of a digital image signal to be transferred to the displays is changed, it has been necessary for the displays that display images based on such digital image signal to change the region data to be used when detecting the regions to be displayed. It is also necessary on the display side to place a circuit that carries out an acquisition process for image data and an extraction determination process for extracting the region to be displayed by such apparatus in an operating state during an entire screen period of the image data in the digital image signal, which has led to an increase in power consumption.

For this reason, in a preferred embodiment of the present disclosure described below, a technology that makes it possible to reduce power consumption on the display side when images according to a high-resolution image format such as those mentioned above are displayed spread across a plurality of displays is described.

Example System Configuration

Next, a preferred embodiment of the present disclosure will be described with reference to the drawings. FIG. 1 is an explanatory diagram showing an example configuration of an image transfer system 1 according to the present embodiment. The image transfer system 1 shown in FIG. 1 is a system that has images displayed spread across a plurality of displays. An example configuration of the image transfer system 1 according to the present embodiment will now be described with reference to FIG. 1.

As shown in FIG. 1, the image transfer system 1 according to the present embodiment includes an image transmission apparatus 100 and image display apparatuses 200a to 200d. The image transfer system 1 according to the present embodiment shown in FIG. 1 is a system in which an uncompressed (i.e., non-encoded) image signal transmitted from the image transmission apparatus 100 is transferred to the image display apparatuses 200a to 200d and images are displayed spread across the image display apparatuses 200a to 200d.

In the present embodiment, it is assumed that the image signal transmitted from the image transmission apparatus 100 is an image signal according to a video format such as 4K or 8K with a screen resolution of around 4,000 to 8,000 horizontal pixels. It should be obvious however that it is possible to apply the technology described below in the same way to an image signal according to a video format with a screen resolution aside from those mentioned above.

In the image transfer system 1 according to the present embodiment shown in FIG. 1, the image signal transmitted from the image transmission apparatus 100 is transferred to the image display apparatuses 200a, 200b, 200d and 200c in that order. The respective image display apparatuses 200a to 200d each grasp the region to be displayed by such image display apparatus in advance and, when an image signal transmitted from the image transmission apparatus 100 has been received, extract and display the region of the image to be displayed by such image display apparatus from the image signal.

In the image transfer system 1 according to the present embodiment shown in FIG. 1, the image transmission apparatus 100 transfers an image signal that forms the basis of the image to be displayed by the image display apparatuses 200a to 200d having divided the image signal in accordance with the display resolutions of the image display apparatuses 200a to 200d and/or the number of image display apparatuses 200a to 200d (in the example in FIG. 1, four).

The image transmission apparatus 100 accumulates the digital image signal inputted from a digital image signal input 11 in an internally provided memory and divides the digital image signal in accordance with the number of the image display apparatuses 200a to 200d connected to a transfer path 12. The image transmission apparatus 100 outputs to the transfer path 12 with a different frame rate to the frame rate of the digital image signal inputted from the digital image signal input 11. As one example, the transfer path 12 may be an HDMI (High Definition Multimedia Interface, registered trademark) cable or other image transfer cable that transfers an image signal according to a video format with a screen resolution of around 4,000 to 8,000 horizontal pixels, such as 4K or 8K.

When dividing the digital image signal, the image transmission apparatus 100 also generates additional information to be used when images are displayed at the image display apparatuses 200a to 200d. The image transmission apparatus 100 adds the generated additional information to the transmitted digital image signal or outputs the generated additional information to the image display apparatuses 200a to 200d using a separate transfer path, not shown in FIG. 1.

The image display apparatuses 200a to 200d receive the digital image signal divided by the image transmission apparatus 100 and the additional information generated by the image transmission apparatus 100 which have been transferred from the image transmission apparatus 100 to the transfer path 12 and detect frames to be displayed based on the additional information. By detecting the frames to be displayed based on the additional information, the image display apparatuses 200a to 200d are capable of intermittently acquiring the image signal. In the present embodiment, the intermittent acquisition of an image signal at the image display apparatuses 200a to 200d is referred to as "intermittent reception". The image display apparatuses 200a to 200d each extract frames to be displayed by such image display apparatuses from the transferred frames and display images based on the image signal.

The image transmission apparatus 100 transfers the image signal having divided the image signal in accordance with the display resolutions of the image display apparatuses 200a to 200d and/or the number of the image display apparatuses 200a to 200d, and by intermittently receiving the image signal that is transferred having been divided at the image display apparatuses 200a to 200d, the image transfer system 1 according to the present embodiment is capable of contributing to a reduction in the power consumption of the image display apparatuses 200a to 200d.

In the example shown in FIG. 1, as described above, a digital image signal is transferred to the image display apparatuses 200a, 200b, 200d, and 200c in that order. The image display apparatuses 200a, 200b, 200c, and 200d may be connected to one another by HDMI cables or another type of image transfer cable for transferring HD or higher-definition images.

Note that although the image display apparatuses 200a to 200d are laid out with two apparatuses in the horizontal direction and two apparatuses in the vertical direction in the example shown in FIG. 1, the layout of the image display apparatuses 200a to 200d for the present disclosure is not limited to this example. As one example, for the present disclosure, all of the image display apparatuses may be laid out in a single horizontal or vertical row. As another example, the present disclosure is not limited to a configuration of image display apparatuses in a layout with two apparatuses in the horizontal direction and two apparatuses in the vertical direction.

This completes the description of an example configuration of the image transfer system 1 according to the present embodiment. Next, an example of the functional configuration of the image transmission apparatus 100 according to the present embodiment will be described.

Example Functional Configuration of Image Transmission Apparatus

FIG. 2 is an explanatory diagram showing an example functional configuration of the image transmission apparatus 100 according to the present embodiment. Such example functional configuration of the image transmission apparatus 100 according to the present embodiment will now be described with reference to FIG. 2.

The image transmission apparatus 100 according to the present embodiment shown in FIG. 2 is an apparatus that transmits a digital image signal that forms the basis of the image to be displayed spread across the image display apparatuses 200a to 200d. As shown in FIG. 2, the image transmission apparatus 100 according to the present embodiment includes an image processing unit 110, memories 120a, 120b, 120c, 120d, . . . , an additional information inserting unit 130, and a transmission unit 140.

The image processing unit 110 executes image processing on the digital image signal inputted from the digital image signal input 11. More specifically, the image processing unit 110 accumulates the digital image signal inputted from the digital image signal input 11 in the memories 120a, 120b, 120c, 120d, . . . provided inside the image transmission apparatus 100 in accordance with the number of the image display apparatuses 200a to 200d connected to the transfer path 12.

As one example, consider a case where the digital image signal inputted from the digital image signal input 11 has 4K pixels (3,840 pixels horizontally and 2,160 pixels vertically), and an image according to such digital image signal is displayed spread across the four image display apparatuses 200a to 200d as shown in FIG. 1. The image processing unit 110 operates so as to accumulate the $1^{st}$ to $1920^{th}$ horizontal pixels and the $1^{st}$ to $1080^{th}$ vertical pixels in the memory 120a. In the same way, the image processing unit 110 operates so as to accumulate the $1921^{st}$ to $3840^{th}$ horizontal pixels and the 1st to $1080^{th}$ vertical pixels in the memory 120b, to accumulate the $1^{st}$ to $1920^{th}$ horizontal pixels and the $1081^{st}$ to $2160^{th}$ vertical pixels in the memory 120c, and to accumulate the $1921^{st}$ to $3840^{th}$ horizontal pixels and the $1081^{st}$ to $2160^{th}$ vertical pixels in the memory 120d. Accordingly, the image processing unit 110 functions as one example of a "dividing unit" according to an embodiment of the present disclosure.

The image processing unit 110 then sequentially reads the digital image signals after division that have been accumulated in the memories 120a, 120b, 120c, 120d, . . . from such memories 120a, 120b, 120c, 120d, . . . and outputs to the transfer path 12 with a different frame rate to the frame rate of the digital image signal inputted from the digital image signal input 11.

In this way, by carrying out an accumulation process in the memories 120a, 120b, 120c, 120d, . . . in accordance with the number of pixels in the digital image signals after division, when outputting a digital image signal to the transfer path 12 it is possible for the image processing unit 110 to have each of the memories 120a, 120b, 120c, 120d, . . . read out the image data in one frame. Accordingly, the circuit configuration of the image processing unit 110 is simplified.

Other effects are also realized by carrying out an accumulation process in the memories 120a, 120b, 120c, 120d, . . . in accordance with the number of pixels in the digital image signals after division. As one example, when switching the image to be displayed on one image display apparatus 200 to a different image to the image displayed on another image display apparatus 200, the image processing unit 110 may rewrite only the content of a memory in which the digital image signal that forms the basis of the image to be displayed on such image display apparatus 200 is stored.

FIG. 3 is an explanatory diagram conceptually showing an example of image processing by the image processing unit 110. In the example shown in FIG. 3, it is assumed that the frame rate of the digital image signal inputted from the digital image signal input 11 is a first frame rate and the resolution is a first resolution. To have the image according to the digital image signal displayed spread across the four image display apparatuses 200a to 200d as shown in FIG. 1, the image processing unit 110 divides the image as shown in FIG. 3 into a second resolution that is lower than the first resolution.

If the digital image signal inputted from the digital image signal input 11 has 4K pixels (3,840 pixels horizontally by 2,160 pixels vertically), the first resolution is 3,840 pixels horizontally by 2,160 pixels vertically and the second resolution is 1,920 pixels horizontally by 1,080 pixels vertically. That is a relationship where the first resolution>second resolution and the first resolution=N (in the present embodiment, 4)×the second resolution is established. The image processing unit 110 divides the digital image signal as shown in FIG. 3 and accumulates the divided signals in the memories 120a, 120b, 120c, 120d, . . . .

The image processing unit 110 outputs the digital image signals accumulated in the memories 120a, 120b, 120c, 120d, . . . to the transfer path 12 with a second frame rate that differs to the frame rate (the first frame rate) of the digital image signal inputted from the digital image signal input 11. When doing so, the image processing unit 110 decides the second frame rate so that the first frame rate<the second frame rate and the second frame rate=N (in the present embodiment, 4)×the first frame rate.

When outputting digital image signals to the image display apparatuses 200a to 200d, the image processing unit 110 sequentially reads out image signals from the memories 120a, 120b, 120c, 120d, . . . with a frame rate (F×N) that is the frame rate F of the inputted digital image signal multiplied by the number (N) of the image display apparatuses 200a to 200d. The image processing unit 110 then outputs the read out image signals to the transmission unit 140.

As one example, if the frame rate of the inputted digital image signal is 60 Hz and images are displayed spread across four image display apparatuses 200a to 200d, the image processing unit 110 outputs a digital image signal with a frame rate of 240 Hz which has been generated by reading out from the memories 120a, 120b, 120c, 120d, . . . to the transmission unit 140.

FIG. 4 is an explanatory diagram conceptually showing another example of image processing by the image processing unit 110. In the example shown in FIG. 3, the image processing unit 110 decides the second frame rate so that the second frame rate is four times the first frame rate. However, there are also conceivable cases where the frame rate cannot be raised to four times the first frame rate, for a reason such as the image display apparatuses 200a to 200d not supporting such frame rate.

As one example, there may be a case where even if the image processing unit 110 outputs a digital image signal with a frame rate of 240 Hz to the transmission unit 140 as in the example described above, the image display apparatuses 200a to 200d do not support the displaying of images based on a digital image signal with a frame rate of 240 Hz.

With consideration to such case, in the example shown in FIG. 4, if the first resolution is 3,840 pixels horizontally by 2,160 pixels vertically, the image processing unit 110 divides the image signal so that the third resolution is 1,920 pixels horizontally by 2,160 pixels vertically. In this case, since the image processing unit 110 divides the digital image signal in two in the horizontal direction, the number of memories used to accumulate the digital image signal also becomes two. Here, it is assumed that the image processing unit 110 accumulates the divided digital image signal in the memories 120a, 120b.

The image processing unit 110 outputs the digital image signals accumulated in the memories 120a, 120b to the transfer path 12 with a third frame rate that differs to the frame rate (first frame rate) of the digital image signal inputted from the digital image signal input 11. When doing so, the image processing unit 110 decides the third frame rate so that the first frame rate<the third frame rate and the third frame rate=N (in the present embodiment, 2)×the first frame rate.

When dividing the image signal and accumulating the image signals after division, the image processing unit 110 generates information (hereafter, referred to as "additional information") on the accumulated digital image signals. The generated information is sent to the additional information inserting unit 130.

FIG. 5 is an explanatory diagram showing an example of the additional information generated by the image processing unit 110 when the image signal is divided by the image processing unit 110. What is shown in FIG. 5 is on example of the data types and data structure of the additional information generated by the image processing unit 110 and it should be obvious that the data structure and data types of the additional information are not limited to such example.

Numbers (for example, 1 to M) of the respective frames in the image signals to be transferred on the transfer path 12 are stored in the #0 data region. In the example shown in FIG. 5, it is assumed that one byte is assigned to the #0 data region. If the image transfer system 1 shown in FIG. 1 is given as an example, since the image transfer system 1 is configured using four image display apparatuses 200a to 200d, the frame numbers may repeat the values 1 to 4 or may repeat 256 numbers that are the maximum number of values that can be expressed using the assigned one byte.

The frame rate of the image signals to be transferred on the transfer path 12 is stored in the #1 data region. In the example shown in FIG. 5, it is assumed that one byte is assigned to the #1 data region. The information on the frame rate of the image signal transferred on the transfer path 12 is information for deciding the repetition cycle for carrying out the intermittent reception of an image signal at the image display apparatuses 200a to 200d and the time for which such intermittent reception is to be carried out.

As the method expressing the data to be stored in the #1 data region, as one example, the upper five bits designate data on an integer multiple (1 to 32) and the lower three bits designate one of 24 Hz, 25 Hz, and 30 Hz that is the lowest common multiple of the original frame rate of the digital image signal inputted from the digital image signal input 11.

The number of pixels H in the #2 and #3 data regions and the number of pixels V in the #4 and #5 data regions respectively store the number of horizontal pixels and the number of vertical pixels in each frame in the image signals to be transferred on the transfer path 12. In the example shown in FIG. 5, it is assumed that two bytes are assigned to each of the number of pixels H and the number of pixels V. In some cases, the number of horizontal pixels and the number of vertical pixels in the digital image signals that have been divided into N by the image processing unit 110 will differ to a number of display pixels that can be displayed by the respective image display apparatuses 200a to 200d. From the information on the number of pixels H and the number of pixels V, it is possible for the respective image display apparatuses 200a to 200d to carry out image processing (enlargement processing or reduction processing) that is necessary for displaying at such apparatuses.

The delay time in the #6 data region stores information for synchronizing the images displayed on the respective image display apparatuses 200a to 200d. As one example, display delay information on the delay between the $x^{th}$ frame and the $x+N-1^{th}$ frame is inserted into the delay time in the #6 data region. In the example shown in FIG. 5, it is assumed that one byte is assigned to the delay time.

As one example, with a configuration where the frame rate of the image signal to be transferred on the transfer path 12 is 240 Hz and the images are to be displayed spread across four image display apparatuses 200a to 200d as shown in FIG. 1, as information on the respective delay times, 4×1000 mS/240Hz=16.7 ms is inserted into the first frame, 3×1000 mS/240 Hz=12.5 ms is inserted into the second frame, 2×1000 mS/240 Hz=8.3 ms is inserted into the third frame, and 0 ms is inserted into the fourth frame.

The delay time information can also be calculated from the frame number, the frame rate, the number of screens N, and the display order. As described later, although the respective image display apparatuses 200a to 200d store the number of screens N and display order in advance, if the additional information is inserted into every image frame, the respective image display apparatuses 200a to 200d will be capable of finding the delay time information by calculation so long as just the display order can be established.

The additional information inserting unit 130 outputs the additional information generated by the image processing unit 110 to the transmission unit 140 at timing of the frame rate (F×N) of the image signal transmitted from the transmission unit 140. It is assumed here that the additional information transmitted by the additional information inserting unit 130 to the transmission unit 140 is the information described above, for example.

FIG. 6 is an explanatory diagram showing an example data structure of the digital image signal generated by the image processing unit 110 and the additional information outputted from the additional information inserting unit 130 to the transmission unit 140. 7-byte additional information generated by the image processing unit 110 and 25 bytes of null packets make a total of 32 bytes of consecutive packets that are inserted into the digital image signal outputted from the image processing unit 110. It should be obvious that the number of bytes in the packets and the structure of the packets are not limited to such and the packets may be configured in various ways.

The transmission unit 140 inserts the additional information inputted from the additional information inserting unit 130 into the respective image frames of the digital image signal inputted from the image processing unit 110. The transmission unit 140 outputs the digital image signal into which the additional information has been inserted to the transfer path 12. Accordingly, the transmission unit 140 functions as one example of a "signal output unit" according to an embodiment of the present disclosure.

Note that although a configuration that transfers the additional information to the image display apparatuses 200a to 200d via the transfer path 12 is shown in the example in FIG. 2, the present disclosure is not limited to such example. As one example, it is possible to configure the additional information inserting unit 130 to use a transfer path 13 that differs to the transfer path 12 on which the digital image signal is transferred to transfer the additional information to the image display apparatuses 200a to 200d independently of the digital image signal. As examples, the transfer path 13 may be a wired cable such as a LAN cable or may be a wireless communication path such as a wireless LAN.

Although with the example functional configuration shown in FIG. 2, the image transmission apparatus 100 carries out a division process and generates the additional information on a digital image signal inputted from the digital image signal input 11, the present disclosure is not limited to such example. The image transmission apparatus 100 may carry out a division process and generate the additional information on a digital image signal that is internally held.

This completes the description of an example functional configuration of the image transmission apparatus 100 according to the present embodiment with reference to FIG. 2. Next, an example functional configuration of the image display apparatuses 200a to 200d according to the present embodiment will be described.

Example Functional Configuration of Image Display Apparatuses

FIG. 7 is an explanatory diagram showing an example functional configuration of the image display apparatuses 200a to 200d (hereinafter referred to simply as the "image display apparatuses 200") according to the present embodiment. The image display apparatus 200 shown in FIG. 7 is an apparatus that carries out the displaying of images based on a digital image signal transferred from the image transmission apparatus 100. An example functional configuration of an image display apparatus 200 according to the present embodiment will now be described with reference to FIG. 7.

As shown in FIG. 7, the image display apparatus 200 according to the present embodiment includes a reception unit 210, an additional information determination unit 220, a storage unit 230, an image processing unit 240, an image memory 250, a display unit 260, and a transmission unit 270.

The reception unit 210 receives, from the transfer path 12, the digital image signal transmitted from the image transmission apparatus 100 to the transfer path 12. As one example, the digital image signal received by the reception unit 210 is a signal with a frame rate (F×N) that is the frame rate F of the digital image signal inputted into the image transmission apparatus 100 multiplied by the number N of image display apparatuses 200a to 200d.

The reception unit 210 outputs the digital image signal received from the transfer path 12 to the transmission unit 270. The reception unit 210 also extracts the additional information from the image frame received in a period during which intermittent reception is carried out in accordance with an intermittent reception instruction from the image processing unit 240, outputs such additional information to the additional information determination unit 220, and additionally outputs the digital image signal of the received image frame to the image processing unit 240.

The additional information determination unit 220 reads out display order information stored in the storage unit 230 and determines whether the frame number of the additional information extracted by the reception unit 210 matches the read out display order information. If the frame number and the display order information match, the additional information determination unit 220 then outputs timing information that is necessary for an intermittent reception operation at the reception unit 210 to the image processing unit 240.

Note that the additional information determination unit 220 may receive additional information transferred via the transfer path 13 that differs to the transfer path 12 on which the digital image signal is transferred and carry out determination on such received additional information. As described above, as examples the transfer path 13 that differs to the transfer path 12 on which the digital image signal is transferred may be a wired cable such as a LAN cable or may be a wireless communication path such as a wireless LAN.

The image processing unit 240 generates timing information for operating the reception unit 210 based on the timing information sent from the additional information determination unit 220 and outputs the timing information to the reception unit 210. Based on the timing information outputted to the reception unit 210, the image processing unit 240 accumulates the digital image signal passed over from the reception unit 210 in the image memory 250. The image processing unit 240 then reads out the accumulated digital image signal from the image memory 250 based on the delay information included in the additional information sent from the additional information determination unit 220 and outputs the digital image signal to the display unit 260.

If, as a result of referring to information on resolution included in the additional information acquired by the additional information determination unit 220, the resolution of the digital image signal accumulated in the image memory 250 differs to the resolution of the display unit 260, the image processing unit 240 may carry out a scaling process (an enlarging or reducing process) on the digital image signal read out from the image memory 250 so as to match the resolution of the display unit 260.

The image memory 250 is a memory that stores the image signal that the image processing unit 240 has acquired from the reception unit 210. So long as the capacity of the image memory 250 is capable of storing the image signal the image processing unit 240 has acquired from the reception unit 210, the image memory 250 is not limited to a specified capacity.

The display unit 260 displays images based on the digital image signal sent from the image processing unit 240. As the display unit 260, a display device such as a liquid crystal display panel or an organic EL display panel may be used.

The transmission unit 270 receives the digital image signal the reception unit 210 has received from the transfer path 12 and outputs the digital image signal as it is to an image display apparatus 200 located downstream. Such image display apparatus 200 located downstream is capable of displaying images to be displayed on such apparatus based on the digital image signal received from the image display apparatus 200 located upstream.

FIG. 8 is an explanatory diagram conceptually showing the intermittent reception instruction outputted from the image processing unit 240 to the reception unit 210. As one example, with a configuration where images are displayed spread across four image display apparatuses 200, it is assumed that the first image display apparatus 200a receives frames with the frame number "1" and the second image display apparatus 200b receives frames with the frame number "2". Since the frame repeat cycle 4T is established from the frame rate information obtained by the additional information determination unit 220, the reception unit 210 may carry out an operation that extracts a frame image in only a period T that is ¼ of such cycle.

At the first image display apparatus 200a, when transfer of the digital image signal has started, the reception unit 210 first receives all of the frames until a frame where the frame number "1" matches can be identified. When it has become possible to identify a frame where the frame number "1" matches, the image processing unit 240 generates, based on a reference signal obtained from a timing generation circuit (not shown) provided in the image display apparatus 200, a digital image signal intermittent reception instruction to be outputted to the reception unit 210.

In the same way, at the second image display apparatus 200b, when transfer of the digital image signal has started, the reception unit 210 first receives all of the frames until a frame where the frame number "2" matches can be identified. When it has become possible to identify a frame where the frame number "2" matches, the image processing unit 240 generates, based on a reference signal obtained from a timing generation circuit (not shown) provided in the image display apparatus 200, an intermittent reception instruction to be outputted to the reception unit 210.

By having the configuration shown in FIG. 7, the image display apparatus 200 according to the present embodiment is capable of having the reception unit 210 operate not in every period of the transferred digital image signal but instead only in periods when images to be displayed by the present image display apparatus 200 are being transferred. That is, the image display apparatus 200 according to the present embodiment is capable of having the reception unit 210 intermittently receive the digital image signal, and in this way by having the reception unit 210 intermittently receive the digital image signal, the image display apparatus 200 according to the present embodiment is capable of reducing power consumption when images are displayed spread across a plurality of image display apparatuses 200.

Since the image display apparatus 200 according to the present embodiment receives a digital image signal whose resolution and frame rate have been changed in advance at the image transmission apparatus 100, the reception unit 210 will be capable of continuing the intermittent reception of the digital image signal even if the resolution of the transferred digital image signal is changes.

This completes the description of an example functional configuration of the image display apparatus 200 according to the present embodiment with reference to FIG. 7. Next, an example operation of the image transmission apparatus 100 according to the present embodiment will be described.

Example Operation of Image Transmission Apparatus

FIG. 9 is a flowchart showing an example operation of the image transmission apparatus 100 according to the present embodiment. The flowchart shown in FIG. 9 shows an example operation where the image transmission apparatus 100 acquires the digital image signal from the digital image signal input 11, carries out image processing on the acquired digital image signal, and outputs to the transfer path 12. An example operation of the image transmission apparatus 100 according to the present embodiment will now be described with reference to FIG. 9.

When the image processing unit 110 of the image transmission apparatus 100 has acquired the digital image signal from the digital image signal input 11 (step S101), the image processing unit 110 divides the acquired digital image signal into image display apparatus 200 units and stores the divided digital image signal in the memories 120a and the like (step S102). When the digital image signal has been divided by the image processing unit 110, the image processing unit 110 generates additional information for having an intermittent reception operation for digital image signals carried out at the image display apparatuses 200 (step S103).

As described above, the additional information generated by the image processing unit 110 in step S103 may include information on frame numbers, the frame rate, the number of horizontal pixels, the number of vertical pixels, and the delay time of the digital image signal to be outputted from the transfer path 12. Aside from an intermittent reception operation for a digital image signal at the image display apparatuses 200, the additional information generated by the image processing unit 110 may be used to display images based on the digital image signal.

When the digital image signal has been divided in step S102 described above and the additional information has been generated in step S103 described above, the image transmission apparatus 100 transmits the digital image signal with a changed frame rate and the additional information generated from the divided digital image signal (step S104). The additional information may be inserted into and transmitted in the respective frames of the digital image signal with the changed frame rate or may be transmitted independently of the digital image signal on the transfer path 13 that is separate to the transfer path 12 of the digital image signal.

If the frame rate cannot be greatly increased due to limitations on the performance of the image display apparatuses 200, the image transmission apparatus 100 may divide the digital image signal as shown in FIG. 4 and use the divided digital image signal to transmit a digital image signal with a changed frame rate.

This completes the description of the example operation of the image transmission apparatus 100 according to the present embodiment with reference to FIG. 9. Next, an example operation of an image display apparatus 200 according to the present embodiment will be described.

Example Operation of Image Display Apparatus

FIG. 10 is a flowchart showing an example operation of an image display apparatus 200 according to the present embodiment. What FIG. 10 shows is an example operation of the image display apparatus 200 when displaying images based on a digital image signal and additional information sent from the image transmission apparatus 100. An example operation of an image display apparatus 200 according to the present embodiment is described below with reference to FIG. 10.

When the digital image signal and additional information sent from the image transmission apparatus 100 have been received at the image display apparatus 200 (step S111), the additional information determination unit 220 uses the received additional information to determine whether it is presently the image extraction timing for the present image display apparatus 200 (step S112). As described above, the digital image signal sent from the image transmission apparatus 100 is a digital image signal that has been divided and whose frame rate has also been changed. Also, as described above, the additional information sent from the image transmission apparatus 100 is information generated by the image transmission apparatus 100 when dividing the digital image signal.

Note that although reception of the digital image signal and the additional information may be carried out at the reception unit 210, if the additional information is transmitted independently of the digital image signal on the transfer path 13 that is separate to the transfer path 12 of the digital image signal, the reception of the digital image signal may be carried out at the reception unit 210 and the reception of the additional information may be carried out at the additional information determination unit 220.

If, as a result of the determination in step S112 described above, it has been determined that it is presently the image extraction timing for the present image display apparatus 200, that is, the digital image signal of the frame received by the reception unit 210 is a digital image signal that forms a basis of an image to be displayed by the present image display apparatus 200, the image display apparatus 200 has the digital image signal extracted by the reception unit 210 according to an instruction from the image processing unit 240 (step S113).

If, in step S113 described above, the image display apparatus 200 has caused the reception unit 210 to extract the digital image signal according to an instruction from the image processing unit 240, an image is displayed by the display unit 260 based on the extracted digital image signal. Also, if the digital image signal has been extracted in step S113 described above, as necessary the image processing unit 240 of the image display apparatus 200 may carry out image processing such as a scaling process on the extracted digital image signal.

Meanwhile, if as a result of the determination in step S112, it has been determined that it is not presently the image extraction timing for the present image display apparatus 200, that is, the digital image signal of the frame received by the reception unit 210 is not a digital image signal that forms a basis of an image to be displayed by the present image display apparatus 200, the image display apparatus 200 skips the processing in step S113 and ignores such digital image signal.

After this, the image display apparatus 200 determines whether the frame subjected to the determination in step S112 described above is the final frame (step S114). If, as a result of the determination in step S114, the frame subjected to the determination in step S112 described above is not the final frame, the image display apparatus 200 returns to step S111 described above and continues to receive the digital image signal and the additional information. Meanwhile, if as a result of the determination in step S114, the frame subjected to the determination in step S112 described above is the final frame, the image display apparatus 200 ends the series of processes shown in FIG. 10.

By carrying out the operation shown in FIG. 10, the image display apparatus 200 according to the present embodiment is capable of having the reception unit 210 operate not in every period of the transferred digital image signal but instead only in periods when images to be displayed by the present image display apparatus 200 are being transferred. By having the reception unit 210 intermittent receive the digital image signal in this way, the image display apparatus 200 according to the present embodiment is capable of reducing power consumption when images are displayed spread across a plurality of image display apparatuses 200.

Since the image display apparatus 200 according to the present embodiment receives a digital image signal whose resolution and frame rate have been changed in advance at the image transmission apparatus 100, the image display apparatus 200 may continue to extract frames to be displayed by the present image display apparatus 200 even the resolution of the digital image signal transferred from the image transmission apparatus 100 is changed.

Accordingly, the image display apparatus 200 according to the present embodiment is capable of continuing the intermittent reception of a digital image signal at the reception unit 210 without adjustment even if the resolution of the digital image signal transmitted from the image transmission apparatus 100 has changed.

3. Conclusion

According to the embodiment of the present disclosure described above, there is provided an image transmission apparatus 100 that divides a digital image signal in accordance with the configuration of image display apparatuses 200 and uses the divided digital image signals to transmit digital image signals with a changed frame rate.

Also, according to the embodiment of the present disclosure described above, there is provided an image display apparatus 200 that extracts only an image signal of a frame to be displayed by such image display apparatus based on a digital image signal and additional information transmitted from the image transmission apparatus 100 and displays an image based on such image signal.

The image transmission apparatus 100 divides the digital image signal, changes the frame rate, and transmits the digital image signal and the image display apparatus 200 carries out an intermittent reception operation that extracts only an image signal of frames to be displayed by such image display apparatus out of the received digital image signal. By doing so, the image display apparatus 200 is capable of reducing power consumption when images are displayed spread across a plurality of the image display apparatuses 200.

Although the image transfer system 1 shown in FIG. 1 has a configuration where the uncompressed (i.e., non-encoded) image signals transmitted from the image transmission apparatus 100 are transferred in an order given as the image display apparatuses 200a, 200b, 200d, and 200c, the present disclosure is not limited to such example. As one example, as shown in FIG. 11, the image transfer system 1 may be configured so that uncompressed image signals transmitted from the image transmission apparatus 100 are transferred to each of the image display apparatuses 200a, 200b, 200c, and 200d.

If the image transfer system 1 is configured as shown in FIG. 11, since it is not necessary to transfer the image signals in the order of the image display apparatuses 200a, 200b, 200d, and 200c, the transmission unit 270 in the example configuration of the image display apparatus 200 shown in FIG. 7 may be omitted.

The respective steps in the processing executed by the various apparatuses described in the present disclosure do not have to be performed in chronological order according to the order described as a sequence diagram or flowchart. For example, the respective steps in the processing executed by the various apparatuses can be carried out in a different order to that described in the flowcharts, or can be carried out in parallel.

In addition, a computer program can be created that makes hardware, such as a CPU, ROM, and RAM, in the various apparatuses realize functions equivalent to the parts of the various above-described apparatuses. Still further, a storage medium on which such a computer program is stored can also be provided. Moreover, series of processes can also be realized by hardware by configuring the respective function blocks illustrated in the function block diagrams as hardware.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An apparatus for transmitting image signals comprising: processing circuitry configured to receive, at a first frame rate, a first image signal having an image with a first resolution; and output, at a second frame rate, a second image signal comprised of a plurality of images having a second resolution, wherein the first resolution is greater than the second resolution and the second frame rate is greater than the first frame rate, so as to satisfy the condition that the first resolution multiplied by the first frame rate is equal to the second resolution multiplied by the second frame rate.

(2) The apparatus according to (1), wherein the first and second image signals are digital image signals.

(3) The apparatus according to (1) or (2), wherein the plurality of images of the second image signal are output sequentially at the second frame rate.

(4) The apparatus according to any one of (1) to (3), wherein the processing circuitry is configured to save in respective memory portions of memory the plurality of images of the second image signal for output, at the second frame rate, as the second image signal comprised of the plurality of images having the second resolution.

(5) The apparatus according to any one of (1) to (4), wherein the processor is configured to divide the first image signal into the plurality of images of the second image signal based on a total number of separate image display portions for displaying the plurality of images of the second image signal.

(6) The apparatus according to any one of (1) to (5), wherein each of the separate image display portions is an image display apparatus.

(7) The apparatus according to any one of (1) to (4), wherein the processor is configured to divide the first image signal into the plurality of images of the second image signal based on one half of a total number of separate image display portions for displaying the plurality of images of the second image signal.

(8) The apparatus according to (7), wherein pairs of the plurality of images of the second image signal are output sequentially at the second frame rate.

(9) The apparatus according to (7) or (8), wherein each of the separate image display portions is an image display apparatus.

(10) A method for transmitting image signals comprising: receiving at a first frame rate, using a processor, a first image signal having an image with a first resolution; and outputting at a second frame rate, using the processor, a second image signal comprised of a plurality of images having a second resolution, wherein the first resolution is greater than the second resolution and the second frame rate is greater than the first frame rate, so as to satisfy the condition that the first resolution multiplied by the first frame rate is equal to the second resolution multiplied by the second frame rate.

(11) The method according to (10), wherein the first and second image signals are digital image signals.

(12) The method according to (10) or (11), wherein the plurality of images of the second image signal are output sequentially at the second frame rate.

(13) The method according to any one of (10) to (12), further comprising saving in respective memory portions the plurality of images of the second image signal for output, at the second frame rate, as the second image signal comprised of the plurality of images having the second resolution.

(14) The method according to any one of (10) to (13), further comprising creating the plurality of images of the second image signal by dividing the first image into the plurality of images, a number of which corresponds to a total number of separate image display portions for displaying the plurality of images of the second image signal.

(15) The method according to any one of (10) to (14), wherein each of the separate image display portions is an image display apparatus.

(16) The method according to any one of (10) to (13), further comprising creating the plurality of images of the second image signal by dividing the first image into the plurality of images based on one half of a total number of separate image display portions for displaying the plurality of images of the second image signal.

(17) The method according to (16), wherein pairs of the plurality of images of the second image signal are output sequentially at the second frame rate.

(18) The method according to (16) or (17), wherein each of the separate image display portions is an image display apparatus.

(19) A non-transitory computer-readable storage medium storing computer-readable instructions that, when executed by a computer, cause the computer to perform a method comprising: receiving, at a first frame rate, a first image signal having an image with a first resolution; and outputting, at a second frame rate, a second image signal comprised of a plurality of images having a second resolution, wherein the first resolution is greater than the second resolution and the second frame rate is greater than the first frame rate, so as to satisfy the condition that the first resolution multiplied by the first frame rate is equal to the second resolution multiplied by the second frame rate.

(20) The non-transitory computer-readable storage medium according to (19), further comprising dividing the first image into the plurality of images.

(21) A signal output apparatus including:
a signal output unit configured to output a digital image signal with a first resolution and a first frame rate in an uncompressed form and at a second frame rate so that a result of multiplying the first resolution by the first frame rate and a result of multiplying a second resolution, which is lower than the first resolution, by the second frame rate match.

(22) The signal output apparatus according to (21), further including:
an image information output unit configured to output image information that has been provided with information for having the digital image signal that has been divided displayed.

(23) The signal output apparatus according to (22),
wherein the image information is added to each frame.

(24) The signal output apparatus according to any one of (21) to (23),
wherein the signal output unit is configured to output the digital image signal with a third frame rate so that a result of multiplying the first resolution by the first frame rate and a result of multiplying a third resolution, where a number of pixels in a horizontal direction is the same as the second resolution and a number of pixels in a vertical direction is double the second resolution, by the third frame rate match.

(25) The signal output apparatus according to any one of (21) to (24), further including:
a storage unit configured to accumulate the digital image signal,
wherein the storage unit is configured with a bank structure in accordance with a number of pixels in the second resolution and the inputted digital image signal is accumulated in a different bank memory for each divided region.

(26) A signal output method including:
outputting a digital image signal with a first resolution and a first frame rate in an uncompressed form and at a second frame rate so that a result of multiplying the first resolution by the first frame rate and a result of multiplying a second resolution, which is lower than the first resolution, by the second frame rate match.

(27) An image display apparatus including:
a reception unit configured to receive, in an uncompressed form, a digital image signal, which has been generated from a digital image signal with a first resolution and a first frame rate, with a second resolution, which is lower than the first resolution, and a second frame rate such that a result of multiplying the first resolution by the first frame rate and a result of multiplying the second resolution by the second frame rate match; and
an image extraction unit configured to extract only frames to be displayed by the image display apparatus out of the digital image signal.

(28) The image display apparatus according to (27), further including:
an image information acquisition unit configured to acquire image information that has been provided with information for having the digital image signal that has been divided displayed.

(29) The image display apparatus according to (28), further including:
a display unit configured to display images based on the digital image signal of the frames extracted by the image extraction unit,
wherein the display unit displays the images with a delay based on information on a delay time included in the image information.

(30) An image display method including:
receiving, in an uncompressed form, a digital image signal, which has been generated from a digital image signal with a first resolution and a first frame rate, with a second resolution, which is lower than the first resolution, and a second frame rate such that a result of multiplying the first resolution by the first frame rate and a result of multiplying the second resolution by the second frame rate match; and
extracting only frames to be displayed by the image display apparatus out of the digital image signal.

(31) A program for causing a computer to execute:
outputting a digital image signal with a first resolution and a first frame rate in an uncompressed form and at a second frame rate so that a result of multiplying the first resolution by the first frame rate and a result of multiplying a second resolution, which is lower than the first resolution, by the second frame rate match.

(32) A program for causing a computer to execute:
receiving, in an uncompressed form, a digital image signal, which has been generated from a digital image signal with a first resolution and a first frame rate, with a second resolution, which is lower than the first resolution, and a second frame rate such that a result of multiplying the first resolution by the first frame rate and a result of multiplying the second resolution by the second frame rate match; and
extracting only frames to be displayed by the image display apparatus out of the digital image signal.

(33) An image display system including:
a signal output apparatus; and
a plurality of image display apparatuses,
wherein the signal output apparatus including a signal output unit configured to output a digital image signal with a first resolution and a first frame rate in an uncompressed form and at a second frame rate so that a result of multiplying the first resolution by the first frame rate and a result of multiplying a second resolution, which is lower than the first resolution, by the second frame rate match, and
wherein each of the image display apparatuses including a reception unit configured to receive, in an uncompressed form, a digital image signal, which has been generated by the signal output apparatus, with a second resolution and a second frame rate, and an image extraction unit configured to extract only frames to be displayed by the image display apparatus out of the digital image signal.

REFERENCE SIGNS LIST

1 image transfer system
100 image transmission apparatus 110 image processing unit
120a, 120b, 120c, 120d memory
130 additional information inserting unit
140 transmission unit
200, 200a to 200d image display apparatus
210 reception unit
220 additional information determination unit
230 storage unit
240 image processing unit
250 image memory
260 display unit
270 transmission unit

The invention claimed is:

1. A first apparatus, comprising:
processing circuitry configured to:
receive, at a first frame rate, a first image signal having image data at a first resolution;
transmit to a plurality of second apparatuses, at a second frame rate, a second image signal comprised of a plurality of images having a second resolution;
determine a time period, based on the second frame rate for each of the plurality of second apparatuses, to extract at least one image from the plurality of images,
wherein each image from the plurality of images comprises a frame number and the at least one image from the plurality of images is extracted by each of the plurality of second apparatuses in the time period based on a match between the frame number and a display order that is stored in each of the plurality of second apparatuses;
determine the second frame rate based on the first frame rate and a number of the plurality of second apparatuses that receives the second image signal,
wherein the first resolution is greater than the second resolution and the second frame rate is greater than the first frame rate, so as to satisfy a condition that the first resolution multiplied by the first frame rate is equal to the second resolution multiplied by the second frame rate; and
determine a delay time for each of the plurality of images, based on the second frame rate and the display order,
wherein the plurality of second apparatuses display the plurality of images with the corresponding delay time.

2. The first apparatus according to claim 1, wherein the first image signal and the second image signal are digital image signals.

3. The first apparatus according to claim 1, wherein the plurality of images of the second image signal are output sequentially at the second frame rate.

4. The first apparatus according to claim 1, wherein the processing circuitry is further configured to save in respective memory portions of a memory, the plurality of images of the second image signal for output at the second frame rate.

5. The first apparatus according to claim 1, wherein the processing circuitry is further configured to divide the first image signal into the plurality of images of the second image signal based on the number of the plurality of second apparatuses.

6. The first apparatus according to claim 5, wherein the processing circuitry is further configured to divide the first image signal into the plurality of images of the second image signal based on one half of the number of the plurality of second apparatuses.

7. The first apparatus according to claim 6, wherein a plurality of pairs of the plurality of images of the second image signal are output sequentially at the second frame rate.

8. A method, comprising:
in a first apparatus:
receiving at a first frame rate, by a processor, a first image signal having image data at a first resolution;
transmitting to a plurality of second apparatuses, at a second frame rate, by the processor, a second image signal comprised of a plurality of images having a second resolution;
determining a time period, based on the second frame rate for each of the plurality of second apparatuses, to extract at least one image from the plurality of images,
wherein each image from the plurality of images comprises a frame number and the at least one image from the plurality of images is extracted by each of the plurality of second apparatuses in the time period based on a match between the frame number and a display order that is stored in each of the plurality of second apparatuses;
determining, by the processor, the second frame rate based on the first frame rate and a number of the plurality of second apparatuses that receives the second image signal,
wherein the first resolution is greater than the second resolution and the second frame rate is greater than the first frame rate, so as to satisfy a condition that the first resolution multiplied by the first frame rate is equal to the second resolution multiplied by the second frame rate; and
determining a delay time for each of the plurality of images, based on the second frame rate and the display order,
wherein the plurality of second apparatuses display the plurality of images with the corresponding delay time.

9. The method according to claim 8, wherein the first image signal and the second image signal are digital image signals.

10. The method according to claim 8, wherein the plurality of images of the second image signal are output sequentially at the second frame rate.

11. The method according to claim 8, further comprising saving in respective memory portions, the plurality of images of the second image signal for output at the second frame rate.

12. The method according to claim 8, further comprising generating the plurality of images of the second image signal by dividing the first image signal into the plurality of images based on the number of the plurality of second apparatuses.

13. The method according to claim 12, further comprising generating the plurality of images of the second image signal by dividing the first image signal into the plurality of images based on one half of the number of the plurality of second apparatuses.

14. The method according to claim 13, wherein a plurality of pairs of the plurality of images of the second image signal are output sequentially at the second frame rate.

15. A non-transitory computer-readable medium having stored thereon computer-executable instructions that, when executed by a processor, cause a computer to execute operations, the operations comprising:
receiving, at a first frame rate, a first image signal having image data at a first resolution;

transmitting to a plurality of second apparatuses, at a second frame rate, a second image signal comprised of a plurality of images having a second resolution;

determining a time period, based on the second frame rate for each of the plurality of second apparatuses, to extract at least one image from the plurality of images,
- wherein each image from the plurality of images comprises a frame number and the at least one image from the plurality of images is extracted by each of the plurality of second apparatuses in the time period based on a match between the frame number and a display order that is stored in each of the plurality of second apparatuses;

determining the second frame rate based on the first frame rate and a number of the plurality of second apparatuses that receives the second image signal,
- wherein the first resolution is greater than the second resolution and the second frame rate is greater than the first frame rate, so as to satisfy a condition that the first resolution multiplied by the first frame rate is equal to the second resolution multiplied by the second frame rate; and determining a delay time for each of the plurality of images, based on the second frame rate and the display order,
- wherein the plurality of second apparatuses display the plurality of images with the corresponding delay time.

16. The non-transitory computer-readable medium according to claim 15, further comprising dividing the first image signal into the plurality of images.

\* \* \* \* \*